Feb. 18, 1930.  F. E. DANIEL  1,747,227
CHILD'S COASTER
Filed March 20, 1928   2 Sheets-Sheet 1
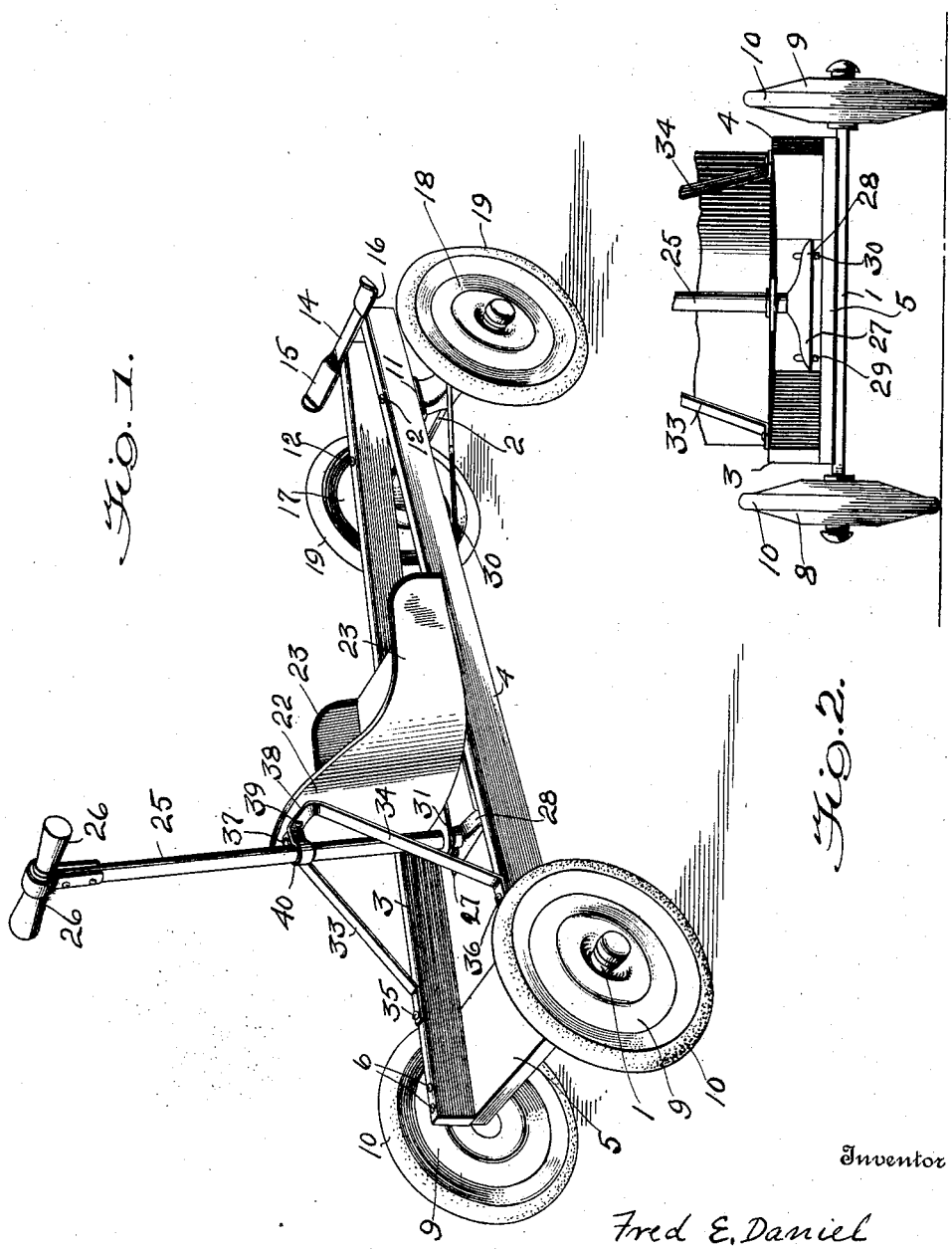
Inventor
Fred E. Daniel
By
Attorney Feb. 18, 1930.　　F. E. DANIEL　　1,747,227
CHILD'S COASTER
Filed March 20, 1928　　2 Sheets-Sheet 2
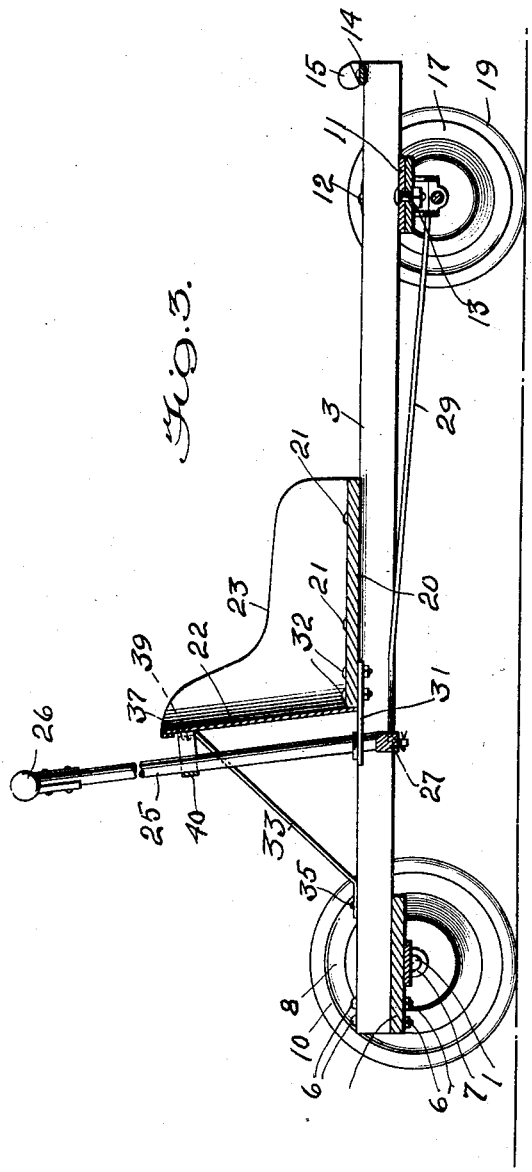
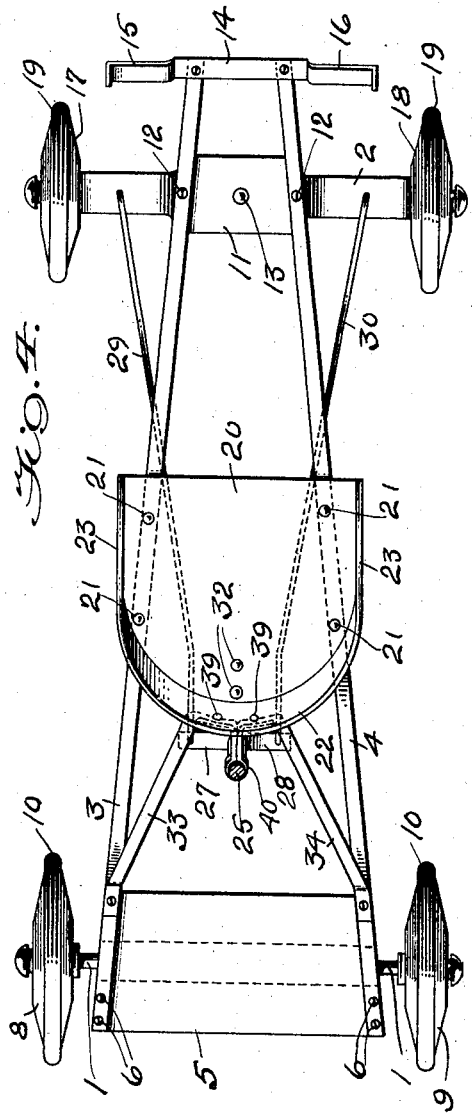

Patented Feb. 18, 1930

1,747,227

UNITED STATES PATENT OFFICE

FRED E. DANIEL, OF INDIANAPOLIS, INDIANA

CHILD'S COASTER

Application filed March 20, 1928. Serial No. 263,008.

My invention relates to children's coasters and has for its object to provide a coaster which will be simple and inexpensive in construction and will be sufficiently strong to sustain the weight of two persons. A further object of my invention is to provide a coaster having a seat for a passenger and means by which a person in rear of the seated passenger may steer the coaster and may at the same time propel it.

With the objects above indicated and further objects hereinafter explained in view my invention consists in the construction and combination of elements hereinafter shown and described.

Referring to the drawings:—

Figure 1 is a perspective view of a coaster embodying my invention.

Figure 2 is an end view of the same taken from the rear.

Figure 3 is a central longitudinal sectional view of the coaster, and

Figure 4 is a top plan view of the same.

In the drawings 1 indicates the rear axle of the car and 2 indicates the front axle. 3 and 4 indicate longitudinally extending side bars extending from a point in rear of the rear axle to a point forward of the front axle relatively wide apart at their rear ends and converging to their forward ends. These side bars are preferably formed of strips of greater width than thickness arranged on edge so as to afford the strength necessary to sustain the weight of the load carried by them. At their rear ends the side bars are connected by a broad plate or plank 5 arranged beneath the side bars and secured to them by bolts 6. To the underside of this plate or plank 5 is secured in any convenient manner as by plates 7, the rear axle 1 carrying at its ends wheels 8 and 9, preferably provided with cushion tires 10. Near the forward ends of the side bars a plate 11, preferably of metal, is secured to their undersides by any convenient means as by bolts 12, having midway its ends a downwardly extending pin 13 which forms the pivot or king bolt for the front axle 2. At their forward ends the side bars are secured together by a plate 14 preferably of metal having laterally extending ends 15 and 16 suitably shaped to serve as foot rests, this plate 14 serving to prevent any tendency of their upper edges to spread. The front axle 2 carries at its ends wheels 17 and 18, preferably provided with cushion tires 19. The two axles 1 and 2 are preferably of the same length so that their wheels will track properly.

Secured on the side bars about midway between the front and rear axles is a seat which may be of any convenient construction but is here shown as comprising a seat board 20 preferably of wood secured to the longitudinal bars by bolts or screws 21 to which is secured a plate preferably of metal suitably shaped to form upwardly extending rearwardly inclined curved back 22 and arms 23.

The longitudinally arranged side bars 3 and 4 arranged edgewise as shown are thus secured together beneath by plate or plank 5 and plate 11 and are secured together above by plate 14 and by seat board 20 so that any tendency of these side bars to spread is effectually prevented.

25 indicates a steering post having at its upper end laterally extending handles 26 and at its lower end laterally extending arms 27, 28, to which are pivotally connected rods 29 and 30 respectively which extend forward and are pivotally connected to front axle 2 at suitable distances from the pivot pin or king bolt 13, the arrangement being such that on turning the handles 26 in either dierction the front axle will be turned in the same direction.

The steering post 25 is arranged in rear of the back 22 of the seat. Its lower end has a bearing in plate 31 which is secured by bolts 32 to the under side of the seat board 20 extending rearward therefrom. For the purpose of affording an upper bearing for the steering post a strip of metal is so bent as to form legs 33, 34, which extend upward and forward from the side bars 3 and 4 to which they are secured by bolts 35 and 36 respectively. At the upper ends of these legs the metal strip is bent to form legs 37 and 38 to fit against the seat back 22 near its central upper edges to which it is secured by bolts or rivets 39. Between these legs 37 and 38 the metal strip is bent rearward with an eye 40 at its middle suitably shaped to receive and form a bearing for the steering post.

Plate or plank 5 is of sufficient width to form a suitable support for the feet of the steerer who in the use of the vehicle may rest both feet in this support when the vehicle is coasting or running down a grade, while in running on a level or on an up grade he may rest one foot on the support and push with the other foot. The steering post is of such length that the child acting to steer, or to steer and propel, may readily retain hold of the handle 26.

The passenger is seated on the seat with his feet usually resting against the arms 15, 16, of the plate 14.

The legs 33 and 34 serve to brace the seat back 22 as well as to carry the upper bearing for the steering post.

It will, of course, be understood that I do not desire to be limited to the precise construction above described as it is obvious that changes in such construction may be made without departing from my invention.

Having thus described my invention what I claim is:—

1. In a children's coaster, a pair of side bars having a rear axle fixed thereto near their rear ends and a front axle pivotally connected thereto near their forward ends, a seat secured to the side bars intermediate their ends having an upwardly extending rearwardly inclined back, a steering post in rear of said seat operatively connected with the front axle and means for sustaining the steering post in position comprising a strip of metal having at its mid portion a bearing for the steering post, and means for securing the mid portion of said strip to the seat back, said strip having legs extending rearward and secured at their lower ends to the side bars.

2. In a children's coaster, a pair of side bars having a rear axle fixed thereto near their rear ends and a front axle pivotally connected thereto near their forward ends, a seat secured to the side bars intermediate their ends having an upwardly extending rearwardly inclined back, a steering post in rear of said seat operatively connected with the front axle and means for sustaining the steering post in position comprising a strip of metal having at its mid portion a bearing for the steering post, means for securing the mid portion of said strip to the seat back, said strip having legs extending rearward and secured at their lower ends to the side bars, and a plate extending rearward from said seat having therein a bearing for the lower end of the steering post.

3. In a children's coaster, a pair of side bars converging toward their forward ends, having a rear axle fixed thereto and a front axle pivotally connected thereto at their front ends, a seat board secured to the side bars intermediate their ends having secured thereto a plate curved to form an upwardly extending rearwardly inclined back and arms, an upwardly extending steering post in rear of the seat back operatively connected with the front axle, and means for sustaining the steering post in position comprising a strip of metal having its mid portion secured to the back plate near its top, provided at its mid portion with a bearing for the steering post and having its end portions spread apart and secured respectively to the side bars near their rear ends.

4. In a children's coaster, a pair of side bars converging toward their forward ends, having a rear axle fixed thereto and a front axle pivotally connected thereto at their front ends, a seat board secured to the side bars intermediate their ends having secured thereto a plate curved to form an upwardly extending rearwardly inclined back and arms, an upwardly extending steering post in rear of the seat back having its lower end operatively connected with the front axle, means for sustaining the steering post in position comprising a strip of metal having its mid portion secured to the back plate near its top, provided at its mid portion with a bearing for the steering post and having its end portions spread apart and secured respectively to the side bars near their rear ends, and a bearing for the lower end of the steering post carried by the seat plate.

In testimony whereof, I hereunto affix my signature.

FRED E. DANIEL.